United States Patent
Mann

(10) Patent No.: US 8,650,572 B2
(45) Date of Patent: Feb. 11, 2014

(54) DIVERSE MESSAGE SYNCHRONIZATION

(75) Inventor: Robert Alexander Mann, Carp (CA)

(73) Assignee: Alcatel Lucent, Paris (FR)

( * ) Notice: Subject to any disclaimer, the term of this patent is extended or adjusted under 35 U.S.C. 154(b) by 1003 days.

(21) Appl. No.: 12/723,906

(22) Filed: Mar. 15, 2010

(65) Prior Publication Data

US 2011/0225113 A1    Sep. 15, 2011

(51) Int. Cl.
  *G06F 9/46*     (2006.01)
(52) U.S. Cl.
  USPC .......................................... 718/102; 718/103
(58) Field of Classification Search
  None
  See application file for complete search history.

(56) References Cited

U.S. PATENT DOCUMENTS

2004/0216112 A1* 10/2004 Accapadi et al. ............. 718/103
2008/0046963 A1   2/2008 Grayson et al.
2009/0109845 A1*  4/2009 Andreasen et al. ........... 370/230

OTHER PUBLICATIONS

3rd Generation Partnership Project; Technical Specification Group Core Network and Terminals; Policy and Charging Control signalling Flows and QoS parameter mapping; (Release 9) 3GPP Standard; 3GPP TS 29.213, 3rd Generation Partnership Project (3GPP), Mobile Competence Centre; 650 Route DED Lucioles; F-06921 Sophia-Antipolis Cedex; France. No. V9.1.0, Dec. 18, 2009, pp. 1-127, XP050401209.
"3rd Generation Partnership Project; Technical Specification Group Core Network and Terminals; Policy and Charging Control over Rx reference point (Release 8)", 3Gpp Standard; 3Gpp TS 29.214, 3rd Generation Partnership Project (3GPP) Mobile Competence Centre; 650, Route Des Lucioles; F-06921 Sophia-Antipolis Cedex; France, No. V8.7.0, Dec. 18, 2009, pp. 1-41, XP050401211.
"3rd Generation Partnership Project; Technical Specification Group Core Network and Terminals; Policy and Charging Control over Gx reference point (Release 9)", 3GPP Srtandard ; 3GPP TS 29.212, 3RD Generation Partnership Project (3GPP) Mobile Competence Centre; 650, Route des Lucioles; F-06921 Sophia-Antipolis Cedex; France. No. V9.1.0, Dec. 18, 2009, pp. 1-106, XP050401206.
International Search Report for PCT/IB2011/000784 dated Jul. 26, 2011.

* cited by examiner

*Primary Examiner* — Gregory A Kessler
(74) *Attorney, Agent, or Firm* — Kramer & Amado P.C.

(57) ABSTRACT

Various exemplary embodiments relate to a method and related network node and machine-readable storage medium relating to the receipt, association, and synchronization of a plurality of messages from diverse sources. Various embodiments relate to a Policy Charging and Rules Node (PCRN) receiving related messages from at least two sources and acquiring a lock associated with the received message's session binding identifier (SBI). The PCRN may use the lock to prioritize the processing of the related requests that share a common SBI. Various embodiments relate to the PCRN rejecting subsequent related requests unless the subsequent request is of a higher priority. Various other embodiments relate to the PCRN waiting for the receipt of the subsequent request before fully processing the first request.

21 Claims, 7 Drawing Sheets

DIVERSE MESSAGE SYNCHRONIZATION

TECHNICAL FIELD

Various exemplary embodiments disclosed herein relate generally to policy and charging in telecommunications networks.

BACKGROUND

As the demand increases for various applications within mobile telecommunications networks, service providers must constantly upgrade their systems in order to reliably provide expanded functionality. What was once solely a system for voice communications has recently grown into a heterogeneous system that enables access to various communications platforms, text messaging, and multimedia streaming, along with general Internet access. To support such applications, service and infrastructure providers have built new networks over existing voice communication infrastructure. While this has enabled added functionality without appreciable service interruptions, such makeshift modifications have served as less-than-ideal long-term solutions for a communications infrastructure. As evidenced by second and third generation networks, voice services must be carried over dedicated voice channels toward a traditional circuit-switched core, while other services, such as IP-enabled data and communications may be transmitted over a different packet-switched core, following Internet protocol (IP). This has led to unique problems, including, for example, application provision, metering and charging, and quality of experience (QoE) assurance.

One recent attempt to enhance the dual-core approach of the second (2G, 2.5G) and third generations (3G) of mobile telecommunications standards defined by the International Telecommunications Union has been in the form of a new set of standards. The Third Generation Partnership Project (3GPP) has recommended a new network scheme deemed 'Long Term Evolution' (LTE). Under the new standards, all communications in an LTE network are carried over an IP channel from user equipment (UE), such as a mobile phone or smartphone, to an all-IP core named the Evolved Packet Core (EPC). The EPC may then provide gateway access to other networks, while also ensuring an acceptable QoE for a user's network activity and properly charging the subscriber for such activity.

The 3GPP generally describes the components of the EPC and their interactions with each other in some technical specifications, specifically, 3GPP TS 29.212, 3GPP TS 29.213, and 3GPP TS 29.214, which describe components such as a Policy and Charging Rules Function (PCRF), Policy and Charging Enforcement Function (PCEF), and Bearer Binding and Event Reporting Function (BBERF) of the EPC. These technical specifications also provided some details regarding the interactions between these components. These specifications gave some guidance on how the EPC could provide reliable data services to users, while also reliably charging subscribers for use of the IP network.

For example, 3GPP TS 29.212, 3GPP TS 29.213, and 3GPP TS 29.214 provide some guidance on handling connectivity when multiple gateways may be used to connect a specific user device to the EPC. Specifically, the specifications provide some guidance on handling a plurality of messages from different sources, such as messages from the BBERF and PCEF. However, the technical specifications are silent on how the system should handle related messages from diverse sources.

In view of the foregoing, it would be desirable to provide a system and method more capable of handling related messages. In particular, it would be desirable to provide a system that may take appropriate action when receiving related messages from multiple sources.

SUMMARY

In light of the present need for a method for handling the related messages from diverse sources, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a method performed by a Policy and Charging Rules Node (PCRN) to process at least two messages received from a plurality of devices, the method including one or more of the following: receiving a first request from a first device, the first request associated with a first Session Binding Identifier (SBI) comprising at least one attribute associated with a first subscriber profile, identifying the first SBI associated with the first request, acquiring a lock associated with the first SBI, the acquisition of the lock indicating that processing cannot be interrupted by other requests, processing the first request, sending an answer message to the first device in response to processing the first request, modifying the lock to indicate that the processing of the first request may be modified by the receipt of at least one priority task, sending a resultant message to at least a second device after processing at least the first request, and releasing the lock.

Various other embodiments may also relate to A Policy and Charging Rules Node (PCRN) to process at least two messages received from a plurality of devices, the PCRN including one or more of the following: a first interface that receives a first request from a first device, the first request associated with a first Session Binding Identifier (SBI) comprising at least one attribute associated with a first subscriber profile, and sends an answer message to the first device in response to processing the first request, a message mate checker that identifies the SBI associated with the first request, a locking device that maintains a lock associated with the first SBI, a rule processor configured to process the first request, acquire the lock from the locking device, the acquisition of the lock indicating that processing cannot be interrupted by other requests, modify the lock associated with the SBI to indicate that the processing of the first request may be modified by at least one priority task, and release the lock, and a second interface that sends a resultant message to at least a second device after processing at least the first request.

It should be apparent that, in this manner, various exemplary embodiments enable dynamic binding of multiple messages originating from diverse sources. Particularly, by enabling the PCRN to synchronize messages from diverse sources, the system may act completely to a user with as little latency as possible.

BRIEF DESCRIPTION OF THE DRAWINGS

In order to better understand various exemplary embodiments, reference is made to the accompanying drawings wherein.

DETAILED DESCRIPTION

Figure 1:
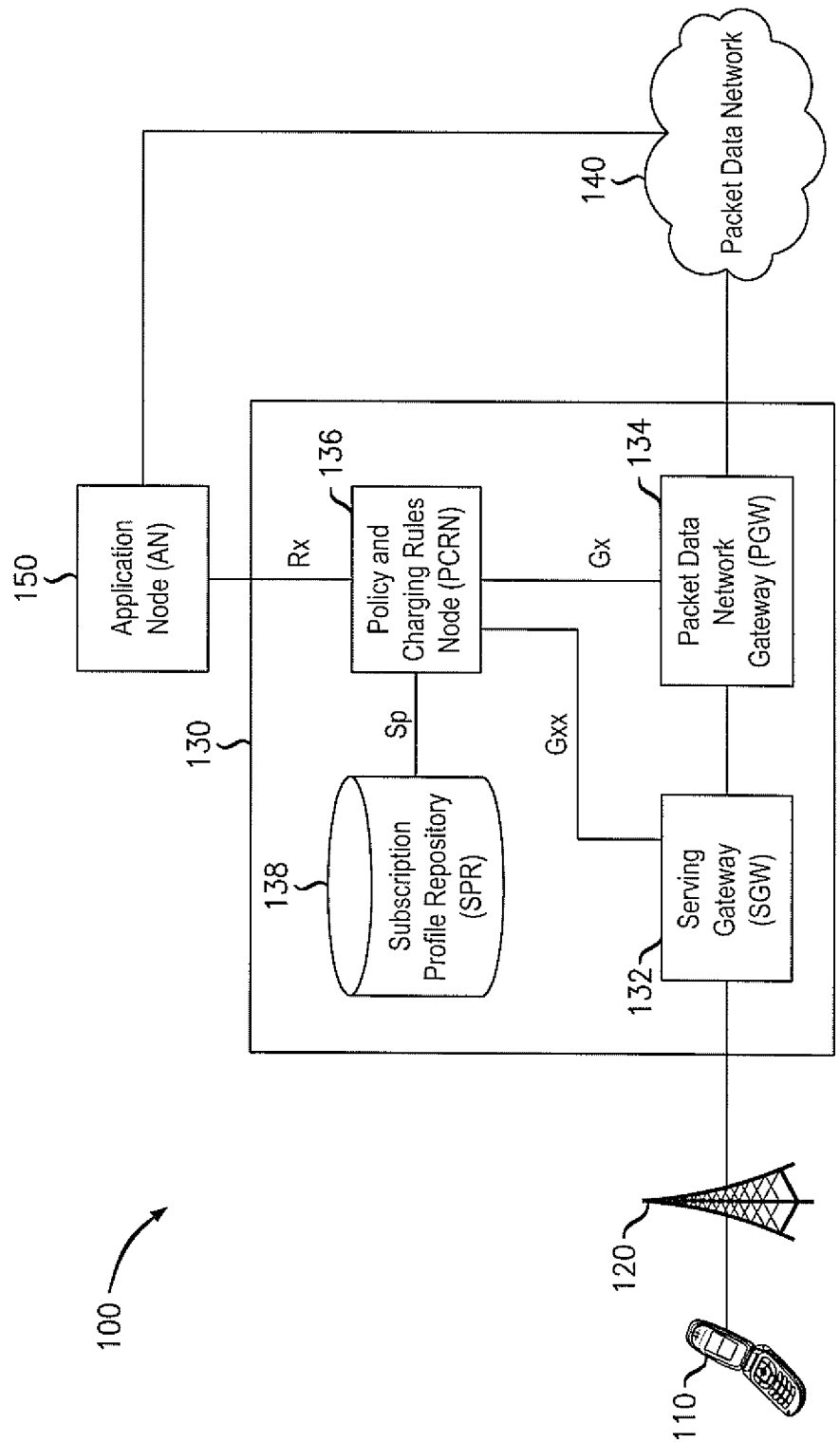
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. Exemplary subscriber network 100 may include at least one piece of user equipment (UE) 110, a base station 120, an evolved packet core (EPC) 130, a packet data network 140, and an application node (AN) 150.

User equipment (UE) 110 may be a device that communicates with the packet data network 140 for providing the end-user with a data service. Such data service may include, for example, voice communication, text messaging, multimedia streaming, and Internet access. Specifically, in various exemplary embodiments, UE 110 is a personal or laptop computer, wireless e-mail device, cellular phone, television set-top box, or any other device capable of communicating with other devices via the EPC 130.

Base station 120 may be a device that enables communication between UE 110 and the EPC 130. For example, the base station 120 may be a base transceiver station such as an evolved nodeB (eNodeB) as defined by 3GPP standards. Thus, the base station 120 may be a device that communicates with the UE 110 via a first medium, such as radio communication, and communicates with the EPC 130 via a second medium, such as an Ethernet cable. Base station 120 may be in direct communication with the EPC 130 or may communicate via a number of intermediate nodes (not shown in FIG. 1). In various embodiments, multiple base stations (not shown) similar to the base station 120 may be present to provide mobility to the UE 110. In various alternative embodiments, UE 110 may communicate directly with the EPC 130. In such embodiments, the base station 120 may not be present.

Evolved packet core (EPC) 130 may be a device or network of devices that provides the UE 110 with gateway access to the packet data network 140. EPC 130 may further charge a subscriber for use of provided data services and ensure that particular quality of experience (QoE) standards are met. Thus, the EPC 130 may be implemented, at least in part, according to the 3GPP TS 29.212, 29.213, 29.214 technical specifications. Accordingly, the EPC 130 may include a serving gateway (SGW) 132, a packet data network gateway (P-GW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by the UE 110. SGW 132 may forward such packets towards the P-GW 134. SGW 132 may perform a number of functions such as, for example, managing mobility of user equipment 110 between multiple base stations (not shown) and enforcing particular quality of service (QoS) characteristics, such as guaranteed bit rate, for each flow being served. In various implementations, such as those implementing the Proxy Mobile Internet Protocol (PMIP) standard, the SGW 132 may include a Bearer Binding and Event Reporting Function (BBERF). In various exemplary embodiments, the EPC 140 may include multiple SGW (not shown) similar to the SGW 132 and each SGW may communicate with multiple base stations (not shown) similar to the base station 120.

Packet data network gateway (P-GW) 134 may be a device that provides gateway access to the packet data network 140. P-GW 134 may be the final device within the EPC 130 that receives packets sent by user equipment 110 toward the packet data network 140 via the SGW 132. P-GW 134 may include a policy and charging enforcement function (PCEF) that enforces policy and charging control (PCC) rules for each service data flow (SDF). Thus, the P-GW 134 may be a policy and charging enforcement node (PCEN). P-GW 134 may include a number of additional features, such as, for example, packet filtering, deep packet inspection, and subscriber charging support.

Policy and charging rules node (PCRN) 136 may be a device that receives requests for services, generates PCC rules, and provides PCC rules to the P-GW 134 and/or other PCENs (not shown). PCRN 136 may be in communication with AN 150 via an Rx interface. PCRN 136 may receive requests from AN 150, SGW 132, or P-GW 134. Upon receipt of a service request, PCRN 136 may generate at least one new PCC rule for fulfilling the service request.

PCRN 136 may also be in communication with SGW 132 and P-GW 134 via a Gxx and a Gx interface, respectively. Upon creating a new PCC rule or upon request by the P-GW 134, PCRN 136 may provide a PCC rule to P-GW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AN 150. Packet data network 140 may further provide, for example, phone and/or Internet service to various user devices in communication with packet data network 140.

Application node (AN) 150 may be a device that includes an application function (AF) and provides an application service to user equipment 110. Thus, AN 150 may be a server or other device that provides, for example, a video streaming or voice communication service to user equipment 110. AN 150 may further be in communication with the PCRN 136 of the EPC 130 via an Rx interface. When AN 150 is to begin providing application service to user equipment 110, AN 150 may generate a request message, such as an AA-Request (AAR) according to the Diameter protocol, to notify the PCRN 136. This request message may include information such as an identification of the subscriber using the application service and an identification of the particular service data flows that must be established in order to provide the requested service. AN 150 may communicate such an application request to the PCRN 136 via the Rx interface.

Figure 2:
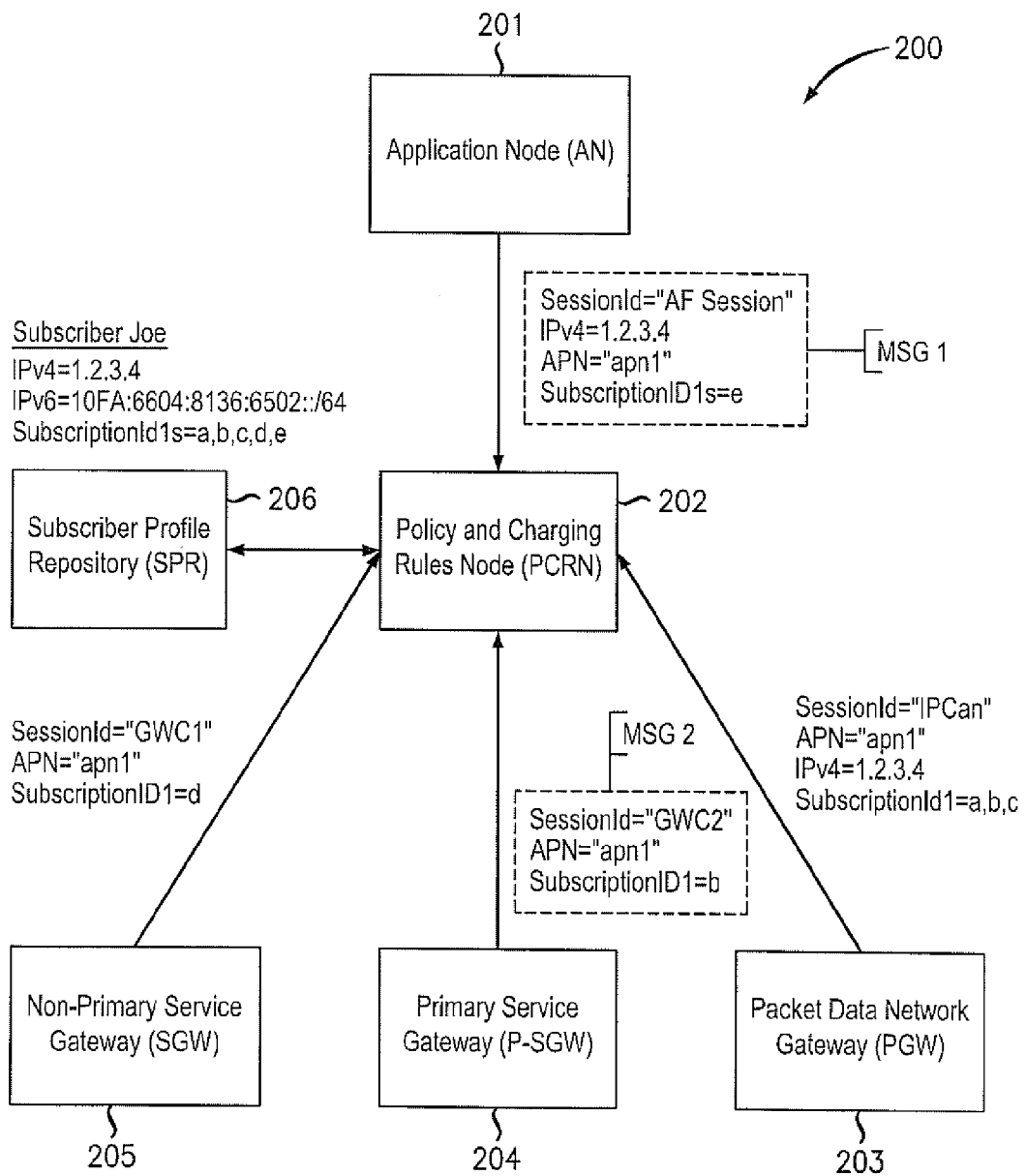
FIG. 2 illustrates an exemplary network for a PCRN receiving multiple related messages from a plurality of sources.

FIG. 2 illustrates an exemplary communications network, with a PCRN receiving multiple messages from a plurality of devices. System 200 may be similar to system 100, with application node (AN) 201, policy and charging rules node (PCRN) 202, packet data network gateway (P-GW) 203, and subscriber profile repository (SPR) 206 corresponding to AN 150, PCRN 136, P-GW 134, and SPR 138, respectively. System 200 may also include primary service gateway (P-SGW) 204 and non-primary service gateway (SGW) 205.

In system 200, multiple related messages may be sent through multiple devices, such as AN 201, P-GW 203, P-SGW 204, and SGW 205, with each message eventually being sent to the PCRN 202. PCRN 202 may then take the information from each message and determine whether the received message relates to any other message the PCRN 202 received. PCRN 202 may then use a common lock to regulate the processing related messages, which may also include related messages sharing a common established session.

For example, AN 201 may send a message (MSG1) to the PCRN 202 that includes information such as its session identification, IPv4 address, at least one subscription identifier, and Access Point Name (APN). Similar messages may also include an IPv6 prefix. The PCRN 202 may then use the information included in MSG1 to determine if the PCRN 202 previously received any related information and, if so, whether the lock associated with that message is free or occupied. This may enable the PCRN 202 to synchronize multiple messages within the same component and enable the multiple messages to share a common session.

PCRN 202 may determine if MSG1 is related to previously received or stored messages by querying the SPR 206 via the Sp interface. For each message received by the PCRN 202, the PCRN 202 may construct a Session Binding Identifier (SBI). The PCRN 202 may then use attributes included in the message's SBI to compare with subscriber profiles stored in SPR 206. The SBI may include any and all information included in a subscriber profile, including, for example, an IPv4 address, IPv6 prefix, APN, and/or subscription identifier(s). However, a message's SBI may only have information included within the particular message. In system 200, for example, the SBI of MSG1 sent from the AN 201 to the PCRN 202 may only include the session identifier, IPv4 address, APN, and subscription identifier(s), but the SBI does not contain an IPv6 prefix.

The PCRN 202 may subsequently receive another message from another device. For example, P-SGW 204 may send a second message (MSG2) to PCRN 202. The SBI of the second message, in contrast to the SBI of MSG1, may contain a different session identifier, APN, and (possibly different) subscription identifier(s). If the PCRN 202 directly compares the two messages, the PCRN 202 may not determine that the two messages are related, as the information included in the SBIs of MSG1 and MSG2 do not directly match each other (e.g., the session and subscription identifiers do not match). In fact, the only information in the two messages that directly match may be, for example, the IPv4 address. In other instances, the only value that may match may be the APN, with the information from each message corresponding to the same subscriber. In many instances, when the PCRN 202 uses the subscription profile stored in the SPR 206, the PCRN 202 may determine that MSG1 and MSG2 are related to the same subscriber profile and therefore should be bound and handled as a group. This may include, for example, binding the application session used by MSG1 with the gateway session used by MSG2. This may also include using a common lock to regulate the PCRN 202 processing MSG1 and MSG2.

During an exemplary operation, the PCRN 202 may immediately begin processing the first message MSG1 upon receipt. This may include a sequence of actions taken by a plurality of components within the PCRN 202 to process the request contained in the first message MSG1. In this exemplary operation, a second message MSG2 may be received by the PCRN 202 that is related to MSG1 while the PCRN 202 is still taking actions in the sequence to process MSG1. The PCRN 202 may detect this relationship by examining the SBI of MSG1 and MSG2 and comparing them with each other. In some embodiments, the PCRN 202 may abandon processing MSG1 and begin processing MSG2. This may be due to MSG2 being of a higher priority level than MSG1. In other embodiments, the PCRN 202 may delay or reject MSG2 until the PCRN 202 finishes processing MSG1.

The PCRN 202 may handle the related requests through the use of a lock associated with the SBI. As the related messages share the same SBI, the lock may be used to prioritize the handling of related requests. The PCRN 202 may, upon receipt of the first message MSG1, generate a lock for MSG1's SBI and retrieve the lock in order to process MSG1. In some embodiments, the PCRN 202 may reject any subsequent requests received that contain the SBI as MSG1, as the lock is held by MSG1 for processing. In further embodiments, the PCRN 202 may reject any subsequent request because MSG1 is an uninterruptible message. The PCRN 202 may, upon commencing the processing of MSG1 modify the status of MSG1 so that is an interruptible or uninterruptible message.

In other embodiments, the PCRN 202 may first check the priority level of MSG1 and the subsequent received message MSG2 to determine whether to cancel the current processing of MSG1 and reassign the lock to MSG2 and commence processing on that message. In further embodiments, the PCRN 202 may partially process MSG1 and wait for a defined waiting period to receive MSG2 before fully processing MSG1. When MSG2 arrives, the PCRN 202 may complete processing MSG1 in conjunction with processing MSG2. If the PCRN 202 never receives the subsequent message MSG2, the PCRN 202 may complete processing the original message MSG1 after the waiting period elapses.

Figure 3:
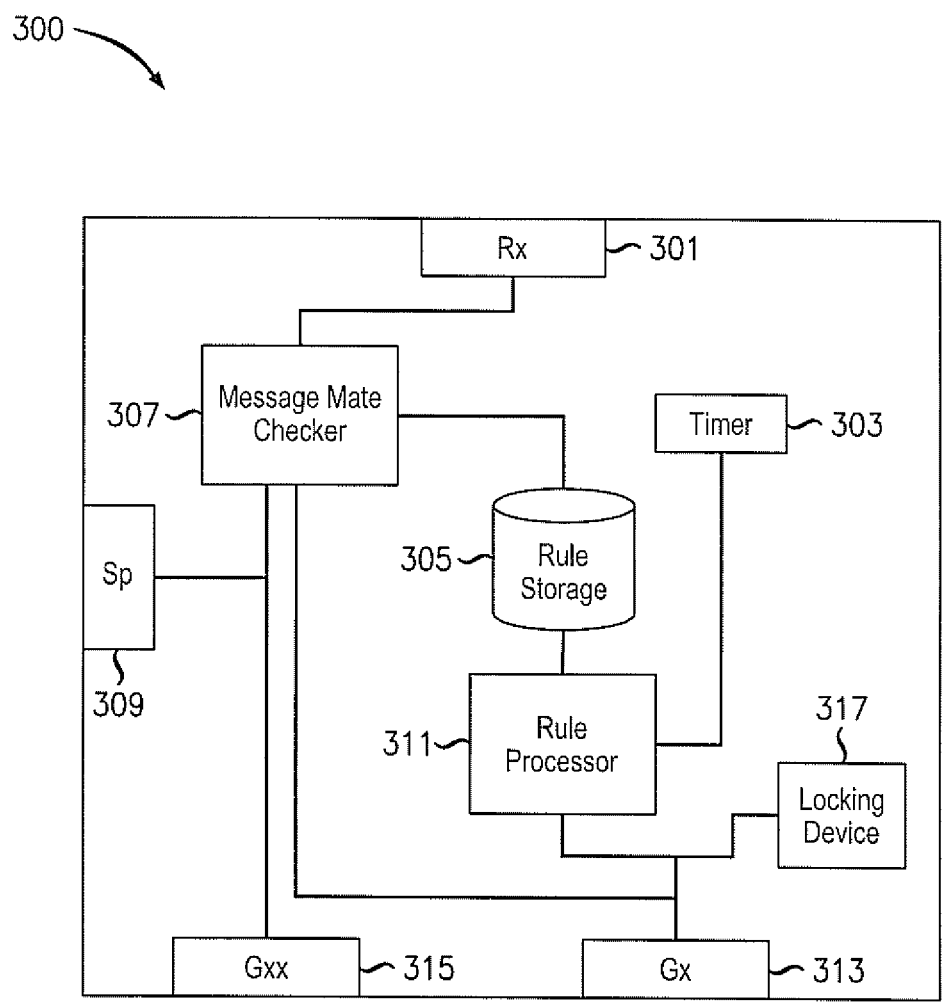
FIG. 3 illustrates an exemplary policy and charging rules node (PCRN) for handling received messages from a plurality of sources.

FIG. 3 illustrates an exemplary policy and charging rules node (PCRN) 300 for handling multiple requests from diverse sources. PCRN 300 may correspond to PCRN 136 of exemplary subscriber network 100 and/or PCRN 202 of exemplary system 200. PCRN 300 may include an Rx interface 301, timer 303, rule storage 305, message mate checker 307, Sp interface 309, rule generator 311, Gx interface 313, Gxx interface 315 and locking module 317.

Rx interface 301 may be an interface comprising hardware and/or executable instructions encoded on a machine-readable storage medium configured to communicate with an application function (AF) such as the AF included in AN 150, 201. Such communication may be implemented according to the 3GPP TS 29.214. Specifically, Rx interface 301 may receive a service request in a message, such as an application request (AAR) from AN 150. The PCRN 200 may translate an incoming service request message from the application node into a service flow. A service flow may include information described by the application message such as, for example, requested bandwidth, subscriber identifier, and/or data stream type.

Timer 303 may include hardware and/or executable instructions on a machine-readable storage medium configured to trigger a period where the PCRN 300 waits for a second, mate service request message to arrive after the PCRN 300 receives a first service request message. The timer 303 may use a set clock period for a task in the PCRN 300 to explicitly wait for a second message. In alternative embodiments, the timer 303 may trigger the PCRN 300 to delay the processing of a task by placing the priority of processing the task in the back of an execution queue. In such instances, the PCRN 300 passively "waits" for a period by executing other functions higher in its execution queue. When the task occurs again in the execution queue, the PCRN 300 may again check to determine if a second, mate service request message has in fact arrived. If not, the PCRN 300 may process the task without the mate message.

Rule storage 305 may be any machine-readable medium capable of storing PCC rules generated by the PCRN 300. Accordingly, rule storage 305 may include a machine-readable storage medium such as read-only memory (ROM), random-access memory (RAM), magnetic disk storage media, optical storage media, flash-memory devices, and/or similar storage media. Rule storage 305 may store definitions of numerous PCC rules created by PCRN 300. Such definitions may include, for example, rule names, service data flow filters, QoS parameters, and charging parameters.

Message mate checker 307 may include hardware and/or executable instructions on a machine-readable storage medium configured to receive messages from a plurality of interfaces and determine if the messages are mates. UE 110 may send complementary messages to a plurality of devices. These messages may include a plurality of information, which may comprise at least an indication as to whether it is expecting a complementary message. Message mate checker 307 may therefore correlate the at least two messages by determining if there is a matching message in the form of a matching application node (AN) request or gateway request. Messages may be processed by rule generator 311, with the resultant rule stored in rule storage 307 until the PCRN 300 receives the matching message from another device.

Sp interface 309 may be an interface comprising hardware and/or executable instructions encoded on a machine-readable storage medium configured to communicate with a SPR such as SPR 138. Thus, Sp interface 309 may transmit record requests and receive subscription profile records.

Rule generator 311 may include hardware and/or executable instructions on a machine-readable storage medium configured to generate a FCC rule based on information included in, for example, service request messages. Rule generator 311 may first generate a PCC rule object from the information received by the PCRN 300. Next, rule generator 311 may generate and store a PCC rule name for the PCC rule. The FCC rule name may be generated according to any method known to those of skill in the art such as, for example, incrementing a previously assigned rule name or generating a random name. Rule generator 311 may also insert other data into the PCC rule. At this point, the PCC rule may be a valid rule ready for installation or may require further modification.

Gx interface 313 may be an interface comprising hardware and/or executable instructions encoded on a machine-readable storage medium configured to communicate with a P-GW such as P-GW 134. Such communication may be implemented according to the 3GPP TS 29.212. Thus, Gx interface 313 may receive requests for PCC rules and transmit PCC rules for installation.

Gxx interface 315 may be an interface comprising hardware and/or executable instructions encoded on a machine-readable storage medium configured to communicate with a SGW such as SGW 132. Such communication may be implemented according to the 3GPP TS 29212. Thus, Gxx interface 315 may receive requests for QoS rules and transmit QoS rules for installation.

Locking device 317 may be a device comprising hardware and/or executable instructions encoded on a machine-readable storage medium configured to create and control a lock associated with each SBI tracked by the PCRN 300. When, for example, receiving requests through the Rx interface 301, the Gx interface 313, or the Gxx interface 315, the incoming message may contain an SBI. Locking device 317 may generate a lock associated with that specific SBI. During an exemplary operation, the rule generator 311 may check out the lock associated with the SBI when processing a request associated with the SBI. Thereafter, if the PCRN 300 receives another request associated with the same SBI, the rule generator 311 may halt the processing of the this subsequent message until the rule generator 311 releases the lock back to the locking device 317. This may involve both processing the request and forwarding the generated PCC rule to devices such as, for example, P-GW 203. This may also involve storing the generated or modified PCC rule in rule storage 305.

Figure 4:
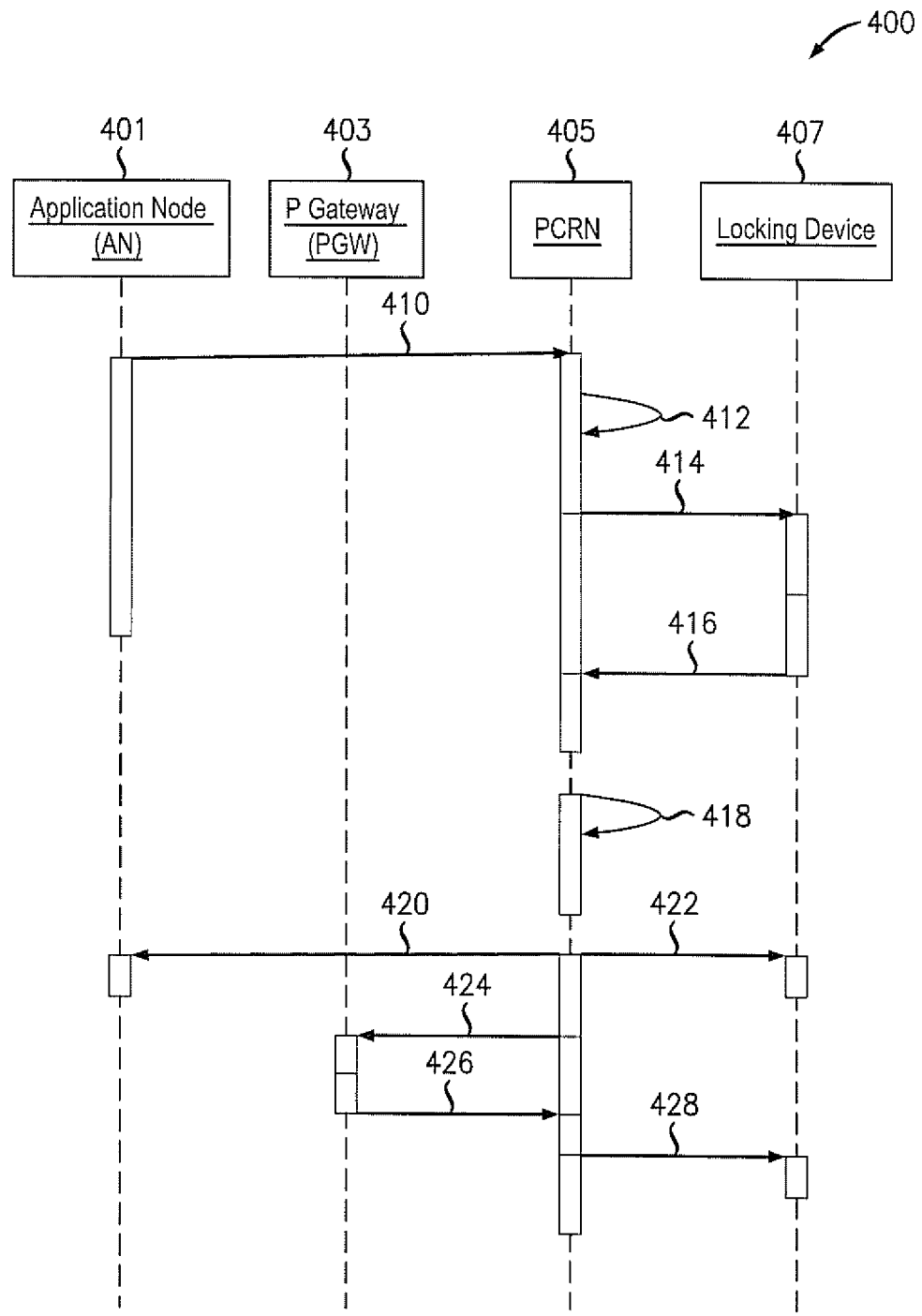
FIG. 4 illustrates an exemplary method for synchronizing messages in response to a modification request by an application node.

FIG. 4 illustrates an exemplary method for synchronizing messages in response to a modification request by an application node. Method 400 may comprise a number of steps involving interactions between components similar to the components of system 100 and system 200. The length of the activation boxes (i.e., method-invocation boxes) for each lifeline 401-407 may be relative to other activation boxes and not to scale. The components used in method 400 may comprise an application node (AN) 401, a packet data network gateway (P-GW) 403, a policy and charging rules node (PCRN) 405, and a locking device 407. Locking device 407 may be a component inside PCRN 405. The actions performed by PCRN 405 may be done by components inside PCRN 405 that are not separately listed.

Method 400 begins at step 410, where AN 401 sends a message to the PCRN 405. The message may be in the form of an Rx AA-Request (AAR). The PCRN 405 in step 412 may then determine the session binding identifier (SBI) from the received application message. The SBI may be extracted from the AAR if it is included in the message. In other embodiments, the PCRN 405 may determine the SBI associate with the application message by using the diameter-session-id in the AAR to find a corresponding AF session. The PCRN 405 may then extract the SBI from the AF session.

In step 414, the PCRN 405 may acquire a lock from the locking device 407. The PCRN 405 may attempt to acquire a lock associated to the SBI associated with the application message. If the lock is not free, the locking device 407 may reject the request and the PCRN 405 may not begin processing of the application request until the lock is released back to the locking device 407. Otherwise, if the lock is free, the PCRN 405 in step 416 may acquire the lock from the locking device 407. In some embodiments, the PCRN 405 may acquire the lock from another component, such as, for example, rule generator 311 when the rule processor is processing a message that acquired the lock, but the received application message is of a higher priority. The acquired lock indicates that the processing of the received application message may not be interrupted by other requests. In some embodiments, the processing may be interrupted only if the priority level of the subsequent received message is higher than the priority level of the application message.

In step 418, the PCRN 405 may process the application message. In some embodiments, the PCRN 405 may not complete the processing of the application message. This may be due to, for example, receiving a higher-priority request. In other embodiments, the processing may halt when the application message causes the PCRN 405 to wait for a related message. In such instances, the PCRN 405 may wait to receive the subsequent message for a waiting period and complete processing the application message when the subsequent message arrives. The PCRN 405 may use information in the related message to complete processing of the application message. When the processing of the application message is complete, the PCRN 405 in step 420 returns an answer in the form of an AA-Answer (AAA) to the AN 401.

In step 422, the PCRN 405 may modify the lock associated with the application message. The PCRN 405 may modify the lock to indicate that the processing of the application message may be interrupted by a priority message. A priority message may include a message that contains an AF session termination, or an IP-CAN session termination requests. This may save processing time, as there is no need to fully process the application message if the associated session is requesting termination.

In step 424, the PCRN 405 may send a message to the P-GW 403 that reflects the resource changes requested by AN 401. The message sent by the PCRN 405 to the P-GW 403 may be in the form of a Gx Re-Authorization Request (RAR) and may include the product of processing the application message. The RAR contents may include, for example, a Policy and Charging Control (PCC) rule generated using the information in at least the application message. The P-GW 403 may respond in step 426 by sending a message back to the PCRN 405. The message received by the PCRN 405 may be in the form of a Gx Re-Authorization Answer (RAA). After receiving the response from the P-GW 403, the PCRN 405 may then in step 428 release the lock back to the locking device 407.

Figure 5:
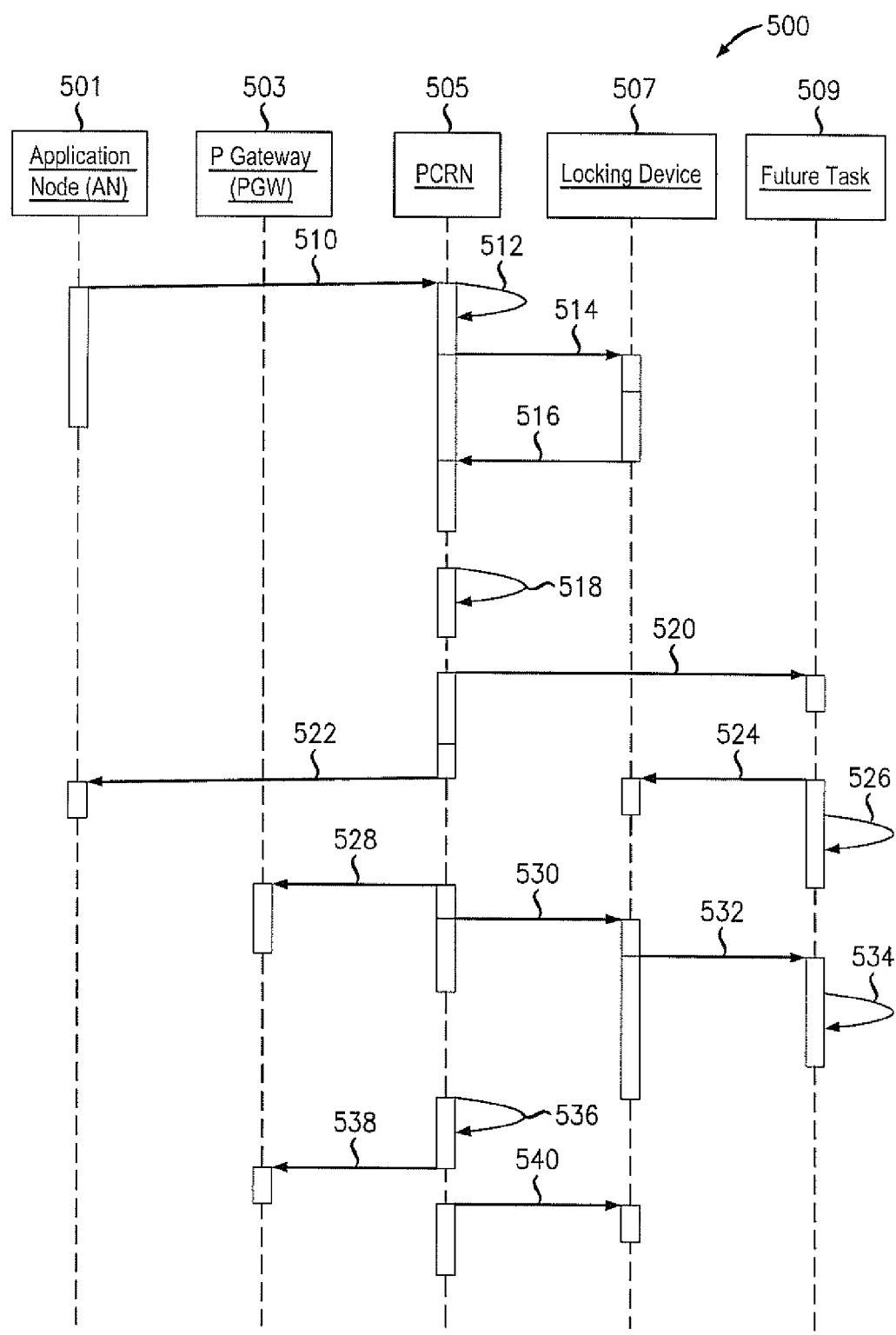
FIG. 5 illustrates an exemplary method for synchronizing messages in response to a UE-initiated resource request.

FIG. 5 illustrates an exemplary method for synchronizing messages in response to a UE-initiated resource request. Method 500 may contain steps similar to steps in method 400. Method 500 may also involve components similar to components used in method 400, with AN 501, P-GW 503, PCRN 505, and locking device 507 corresponding to their like-numbered components 401-407. Method 500 may also involve a future task module 509, which may be a separate component within the PCRN 505. The future task module may be a separate hardware device or a component of rule generator 311.

Beginning at step 510, the steps 510-518 of method 500 correlate to steps 410-418 of method 400, where the PCRN 505 receives an AAR from AN 501, retrieves the SBI associated with the received message, attempts to acquire a lock associated with the retrieved SBI, and begins processing the message when the lock is acquired.

At step 520, the PCRN 405 creates a future task in future task module 509. The future task has a role to wait for a defined period of time and then check whether the PCRN 505 received a Credit and Control Request (CCR) from the P-GW 503 with the same SBI as the application message. If the corresponding gateway message arrives, the future task may interrupt the processing of the application message to process the gateway message. Otherwise, the PCRN 405 may finish processing the application message and send an AAR to P-GW 503 when the PCRN 405 does not receive the corresponding gateway message. Step 522 may correspond to step 420, where the PCRN returns an AAA to AN 501.

In step 524, the future task module 509 may modify the lock in locking device 507. The future task module 509 may modify the lock to indicate that processing of the application message may be modified by a superseding message. A superseding message may contain a request of a higher priority, which may include, for example, AF session termination, IP-CAN session requests, or a Gx CCR request associated with the lock's SBI. The future task module 509 may also modify the lock to notify the future task module 509 whenever the lock is acquired. The lock may then notify the future task module 509, for example, when a corresponding gateway message arrives and subsequently acquires the lock. The notification may therefore indicate to the future task module that the subsequent related message did arrive.

In step 526, the future task module 509 may wait for a defined period for the PCRN 505 to receive the corresponding gateway message. The future task module 509 may use a timer to wait for a defined waiting period. In other embodiments, the future task module may schedule a task at the end of the execution queue of the PCRN 505 so that the waiting period may be defined by the time it takes the PCRN 505 to process the earlier actions in its execution queue. The PCRN 505 in step 528 may receive the corresponding gateway message, which may be a Gx CCR request. The PCRN 505 may determine that the received gateway message corresponds to the application message by, for example, determining that the messages have a matching SBI.

In step 530, the PCRN 505 may acquire the lock held by the application message, as the lock was modified in step 524 to allow interruptions by the corresponding gateway message. This may occur after the PCRN 505 completed processing the application request. The lock may also be modified so that processing of the gateway message may only be interrupted by a priority message. Such priority messages may include requests such as, for example, AF session termination or IP-CAN session termination requests. Locking device 507 may then in step 532 notify the future task module 509 that the lock has been acquired by the gateway message. The future task module 509 may then in step 534 terminate the future task.

In step 536, the PCRN 505 may process the gateway message. PCRN 505 may process the gateway request using information included in, for example, the CCR message and the earlier processed AAR. PCRN 505 may create a new PCC rule using the CCR, or may modify an existing PCC rule. PCRN 505 may then in step 538 return a message to the P-GW 503. The message may be in the form of a Charging and Control Answer (CCA) and may include the new or modified PCC rule. PCRN 505 may then in step 540 release the lock back to the locking device 507.

Figure 6:
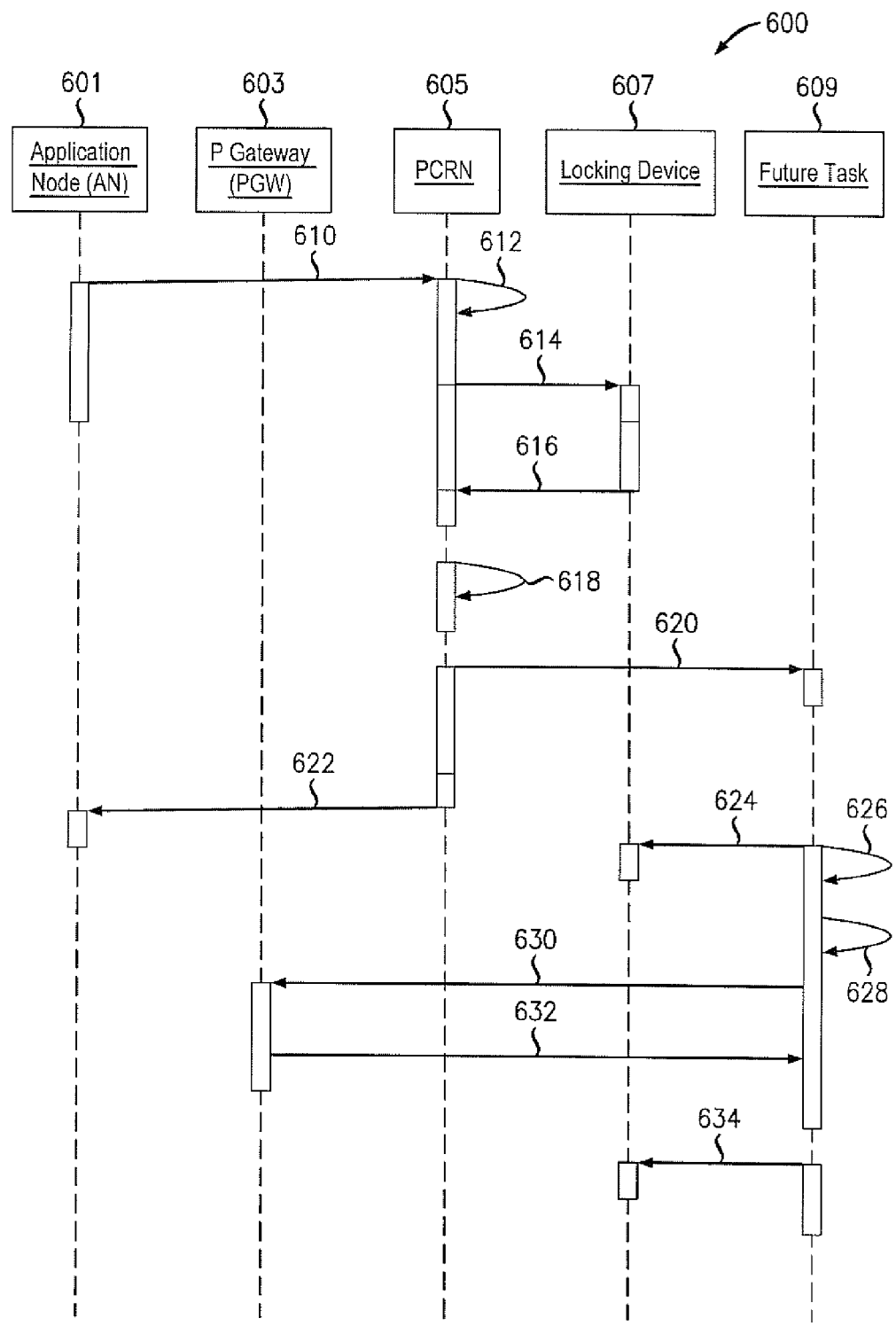
FIG. 6 illustrates an exemplary method for synchronizing messages from diverse sources when the PCRN fails to receive at least one message.

FIG. 6 illustrates an exemplary method for synchronizing messages from diverse sources when the PCRN fails to receive at least one message. Method 600 contains steps similar to steps in methods 400, 500. Method 600 may also involve components similar to components used in method 400, 500, with AN 601, P-GW 603, PCRN 605, and locking device 607 corresponding to their like-numbered components 401-407 and 501-509, respectively.

Beginning at step 610, the steps 610-626 of method 600 correlate to steps 510-526 of method 500, where the PCRN 605 receives an AAR from AN 601, retrieves the SBI associated with the received message, attempts to acquire a lock associated with the retrieved SBI, and begins processing the message when the lock is acquired. The future task module 609 creates a future task and the PCRN 605 then returns an answer to the AN 601. The future task modifies the lock to indicate processing may be interrupted by a superseding message. The future task then waits for the corresponding gateway message to arrive.

However, in step 628, the waiting period expires without the PCRN 605 receiving the corresponding gateway message. Therefore, in step 630, the future task module 609 may send a message to the P-GW 603. The message may be in the form of a Gx RAR and may contain a PCC rule created without information included in a gateway message. The PCC rule may be the PCC rule created when processing the application request. In step 632, the P-GW 603 may return a message in the form of a Gx RAA to the future task module 609. The future task module 609 may then in step 634 release the lock back to the locking device 607.

Figure 7:
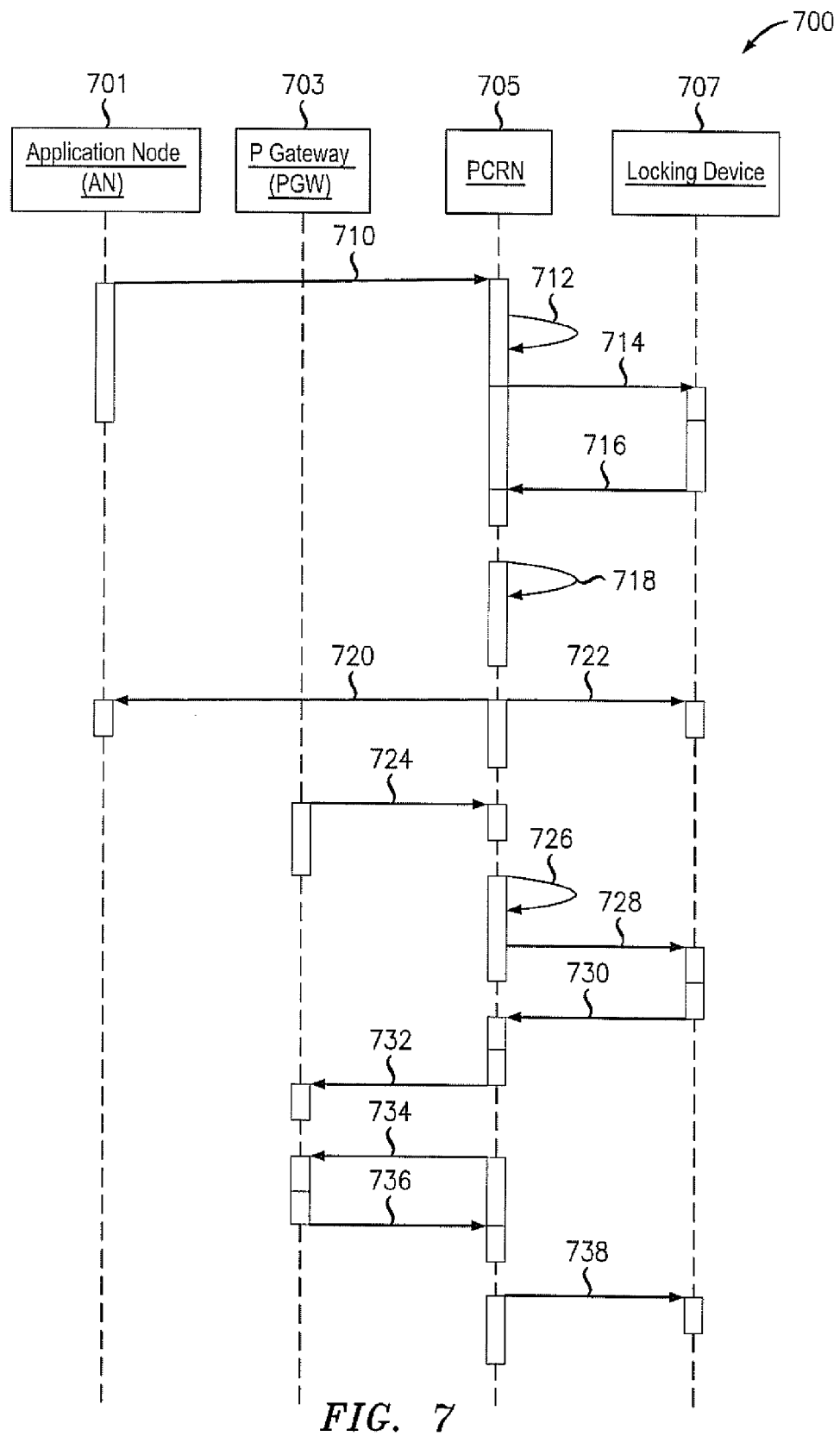
FIG. 7 illustrates an exemplary method for synchronizing messages from diverse sources when a message received from a first source conflicts with a message received from a second source.

FIG. 7 illustrates an exemplary method for synchronizing messages from diverse sources when a message received from a first source conflicts with a message received from a second source. Method 700 may contain steps similar to steps in method 400. Method 700 may also involve components similar to components used in method 400, with AN 701, P-GW 703, PCRN 705, and locking device 707 corresponding to their like-numbered components 401-407.

Beginning at step 710, the steps 710-722 of method 700 may correlate to steps 410-418 of method 400, where the PCRN 705 receives an AAR from AN 701, retrieves the SBI associated with the received message, attempts to acquire a lock associated with the retrieved SBI, and begins processing the message when the lock is acquired. The PCRN 705 may then send an AAA to the AN 701 after it begins processing the received message. The PCRN 705 may then modify the lock to indicate that the processing of the application request may be interrupted by a priority message, which may include, for example, an AF session termination or an IP-CAN session termination request.

In step 724, the PCRN 705 receives a message from the P-GW 703. The gateway message received by the PCRN 705 may be in the form of a Gx CCR and may contain an event notification. This notification may be a request to begin processing. PCRN 705 in step 726 may acquire the SBI of the received gateway message by extracting the SBI from the CCR request. Step 726 may correlate with step 712, where the PCRN 705 may attempt to acquire the SBI by, for example, using the diameter-session-id to find a corresponding IP-CAN session and then extracting the SBI from the IP-CAN session. After acquiring the SBI, the PCRN in step 728 may attempt to acquire the lock from the locking device 707.

In step 730, the PCRN 705 may fail to acquire the lock from the locking device 7070, as the CCR request may not have been a priority task and therefore may not have been able to interrupt the processing of the application request. PCRN 705 may therefore in step 732 return a message to the P-GW 703 in the form of a Gx CCA, indicating that the request could not be processed.

In step 734, the PCRN 705 may send a subsequent message to the P-GW 703. The subsequent message may be in the form of a Gx RAR. The subsequent message may include resource changes requested by the AN 701 in its application message. Such resource changes may include, for example, the generation or modification of a PCC rule. The PCRN 705 may then receive a response from the P-GW 703 in the form of a Gx RAA. The PCRN 705 then in step 738 release the lock back to the locking device 707.

According to the foregoing, various exemplary embodiments provide for dynamic association and synchronization of messages from diverse sources when received by the PCRN. Particularly, by using a lock associated with unique session binding identifiers (SBIs) that are included in each incoming message, the PCRN may coordinate the processing of related messages in a timely fashion and may process related messages with different priority levels, therefore saving processing time and resources.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a Policy and Charging Rules Node (PCRN) to process at least two messages received from a plurality of devices, the method comprising:
   receiving a first request from a first device, the first request associated with a first Session Binding Identifier (SBI) comprising at least one attribute associated with a first subscriber profile;
   identifying the first SBI associated with the first request;
   acquiring a lock associated with the first SBI, the acquisition of the lock indicating that processing cannot be interrupted by other requests;
   processing the first request;
   sending an answer message to the first device in response to processing the first request;
   modifying the lock to indicate that the processing of the first request may be modified by the receipt of at least one priority task;
   sending a resultant message to at least a second device after processing at least the first request; and
   releasing the lock.

2. The method of claim 1, wherein the identifying of the SBI associated with the first request further comprises:
  finding a corresponding session to the first request, said finding step further comprising using a diameter-session-id included in the first request; and
  extracting a session SBI from the corresponding session, wherein the session SBI is equivalent to the first SBI.

3. The method of claim 1, wherein the at least one priority task comprises an action that may interrupt processing of the first request and cause the PCRN to process said action, the priority task comprising at least one of:
  an application session termination;
  an IP-CAN session termination; or
  a second request from the second device.

4. The method of claim 1, further comprising:
  generating a future task, the future task that:
    modifies the lock to indicate that processing may be interrupted by at least one superseding task, wherein the future task is notified if the superseding task occurs,
    waits for a defined period,
    checks for receipt of a second request from the second device, wherein the second request associated with the first SBI; and
    sends the resultant message to the second device when the second request does not arrive, wherein the resultant message is created without receiving information from the second device.

5. The method of claim 4, further comprising:
  receiving the second request from the second device, the second request associated with the first SBI;
  acquiring the lock from the first request;
  modifying the lock to indicate that the processing of the second request may be modified by the receipt of at least one superseding task;
  notifying the future task that the second request has acquired the lock;
  terminating the future task;
  processing the second request; and
  sending the resultant message to at least the second device after processing the second request.

6. The method of claim 4, further comprising:
  sending, by the future task, a notification message to the second device when the second request does not arrive; and
  receiving a notification answer from the second device in response to the notification message.

7. The method of claim 1, further comprising:
  receiving a second request from the second device, the second request associated with the first SBI;
  identifying a second SBI associated with the second request, the second SBI equivalent to the first SBI;
  attempting to acquire the lock associated with the first SBI;
  returning a failure message indicating that the second request could not be processed when the attempt to acquire the lock associated with the first SBI failed; and
  receiving a failure answer from the second device in response to the failure message.

8. The method of claim 4, wherein the at least one superseding task comprises an action that may interrupt processing of the first request and cause the PCRN to process said action, the superseding task comprising at least one of:
  an application session termination; or
  an IP-CAN session termination.

9. The method of claim 1, wherein the first device is an application node (AN) and the second device is a packet data network gateway (P-GW).

10. The method of claim 1, wherein the PCRN acquires the lock associated with the first SBI from a locking device, wherein the PCRN includes the locking device.

11. The method of claim 4, wherein the defined period is defined by scheduling the future task at the end of the PCRN's execution queue.

12. A Policy and Charging Rules Node (PCRN) to process at least two messages received from a plurality of devices, the PCRN comprising:
  a first interface that receives a first request from a first device, the first request associated with a first Session Binding Identifier (SBI) comprising at least one attribute associated with a first subscriber profile, and sends an answer message to the first device in response to processing the first request;
  a message mate checker processor that identifies the SBI associated with the first request;
  a locking device that maintains a lock associated with the first SBI;
  a rule processor that:
    processes the first request;
    acquires the lock from the locking device, the acquisition of the lock indicating that processing cannot be interrupted by other requests;
    modifies the lock associated with the SBI to indicate that the processing of the first request may be modified by at least one priority task, and
    releases the lock; and
  a second network interface that sends a resultant message to at least a second device after processing at least the first request.

13. The PCRN of claim 12, identification of the SBI associated with the first request by the message mate checker processor further comprises:
  finding a corresponding session to the first request, said finding step further comprising using a diameter-session-id included in the first request; and
  extracting a session SBI from the corresponding session, wherein the session SBI is equivalent to the first SBI.

14. The PCRN of claim 12, wherein the at least one priority task comprises an action that may interrupt processing of the first request and cause the PCRN to process said action, the priority task comprising at least one of:
  an application session termination;
  an IP-CAN session termination; or
  a second request from the second device.

15. The PCRN of claim 12, further comprising:
  a future task processor that generates a future task, the future task that:
    modifies the lock to indicate that processing may be interrupted by at least one superseding task, wherein the future task is notified if the superseding task occurs,
    waits for a period,
    checks for receipt of a second request from the second device, wherein the second request corresponds to the first request; and
    sends a missing request to the second device when the second request does not arrive, the missing request comprising a request sent to the second device without receiving information from the second device.

16. The PCRN of claim 15, wherein:
  the second interface receives the second request from the second device, the second request associated the first SBI;
  the rule processor acquires the lock from the first request, modifies the lock to indicate that it may be modified by a superseding task, notifies the future task that the second request has acquired the lock, and processes the second request;

the future task processor terminates the future task; and the second interface sends the response to the second device after processing the second request.

17. The PCRN of claim 15, wherein the second device:

sends a notification message to the second device when the second request does not arrive; and receives a notification answer from the second device in response to the notification message.

18. The PCRN of claim 12, wherein:

the second interface receives a second request from the second device, the second request associated with the first SBI;

the message mate checker processor identifies a second SBI associated with the second request, the second SBI equivalent to the first SBI;

the rule processor attempts to acquire the lock associated with first SBI, returns a failure message indicating that the second request could not be processed when the attempt to acquire the lock associated with the first SBI failed, and receives a second response from the second device after sending a request to the second device after processing the first request.

19. The PCRN of claim 15, wherein the at least one superseding task comprises an action that may interrupt processing of the first request and cause the PCRN to process said action, the superseding task comprising at least one of:

an application session termination; or an IP-CAN session termination.

20. The PCRN of claim 12, wherein the first device is an application node (AN) and the second device is a packet data network gateway (P-GW).

21. The PCRN of claim 15, wherein the defined period is defined by scheduling the future task at the end of the rule processor's execution queue.

* * * * *